United States Patent [19]

Craig et al.

[11] 4,005,225
[45] Jan. 25, 1977

[54] BAKERY PROCESS AND DEVELOPER COMPOSITION THEREFOR

[75] Inventors: Theodore W. Craig, Lafayette; Juan Lopez, Livermore; Richard G. Henika, Alamo, all of Calif.

[73] Assignee: Patent Technology Inc., San Francisco, Calif.

[22] Filed: July 30, 1976

[21] Appl. No.: 710,215

Related U.S. Application Data

[63] Continuation-in-part of Ser. No. 604,197, Aug. 13, 1975, abandoned.

[52] U.S. Cl. .................. 426/21; 426/23; 426/653
[51] Int. Cl.² ............... A21D 2/22; A21D 2/28
[58] Field of Search ........... 426/19, 21, 23, 24, 426/26, 656, 653

[56] References Cited

UNITED STATES PATENTS

| | | | |
|---|---|---|---|
| 3,053,666 | 9/1962 | Henika et al. | 426/23 |
| 3,615,680 | 10/1971 | Henika | 426/23 |
| 3,803,326 | 4/1974 | Craig et al. | 426/653 X |
| 3,876,805 | 4/1975 | Craig et al. | 426/23 |
| 3,900,570 | 8/1975 | Stagler | 426/24 X |

FOREIGN PATENTS OR APPLICATIONS

| | | | |
|---|---|---|---|
| 868,303 | 4/1971 | Canada | 426/23 |

Primary Examiner—Raymond N. Jones
Attorney, Agent, or Firm—Flehr, Hohbach, Test, Albritton & Herbert

[57] ABSTRACT

A developer composition is provided for use in a short time process for the manufacture of leaven bread and like bakery products to impart particular desired characteristics to said bakery products in the form of a very soft and fine-grained texture together with a low specific volume. The developer composition consists of a mixture of (a) amino acid reducing substance containing free sulfhydryl groups (b) ascorbic acid and (c) monocalcium phosphate, in combination with a proportion of dry blending agent. The proportion of monocalcium phosphate in the developer composition is much lower than customary levels.

13 Claims, 4 Drawing Figures

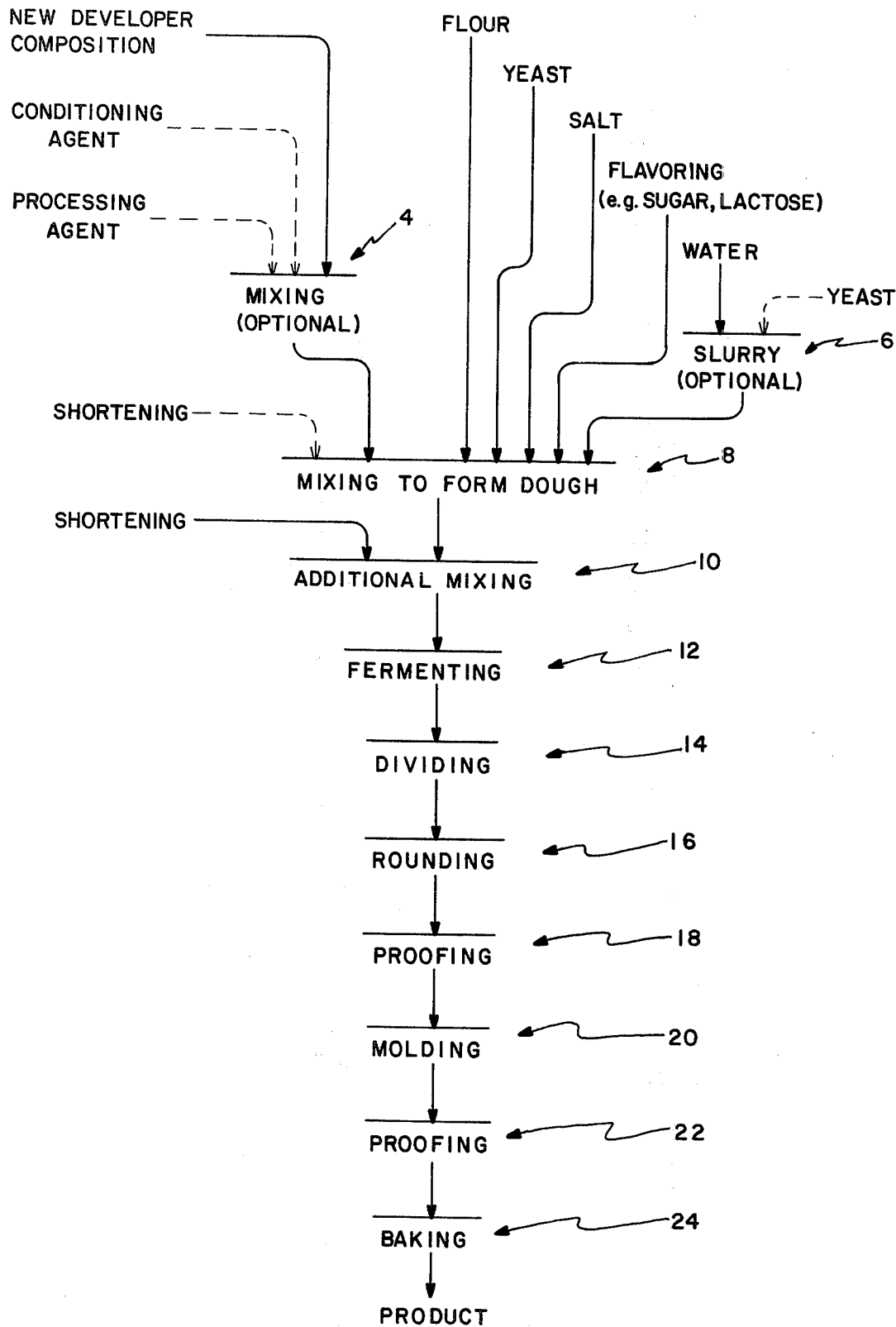
FIG.—1

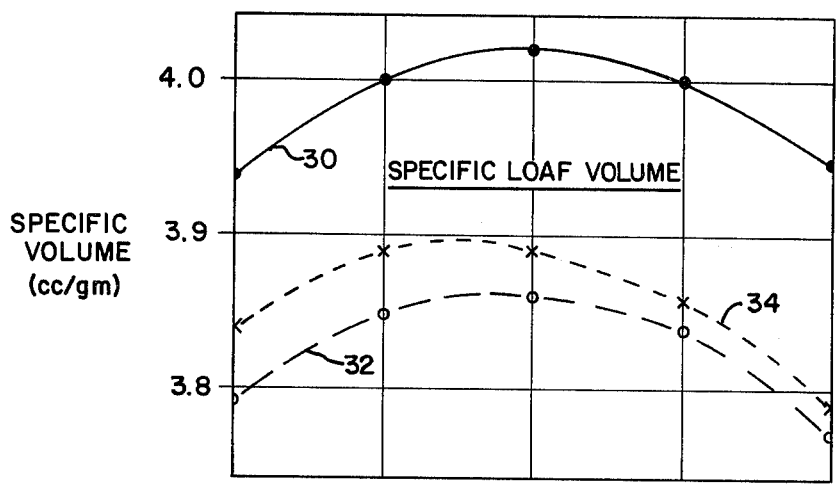
FIG.—2A
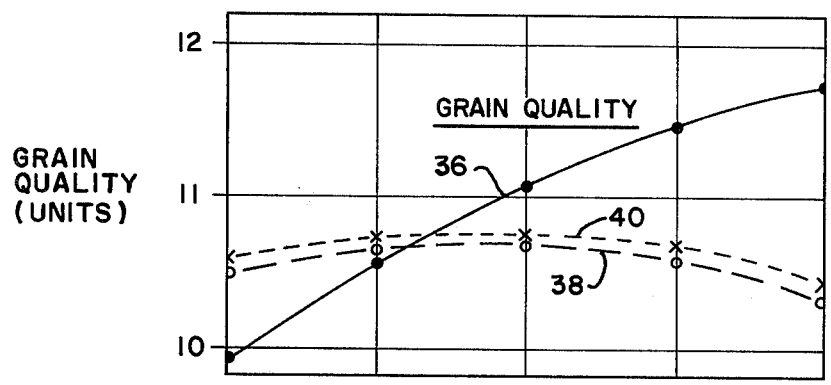
FIG.—2B
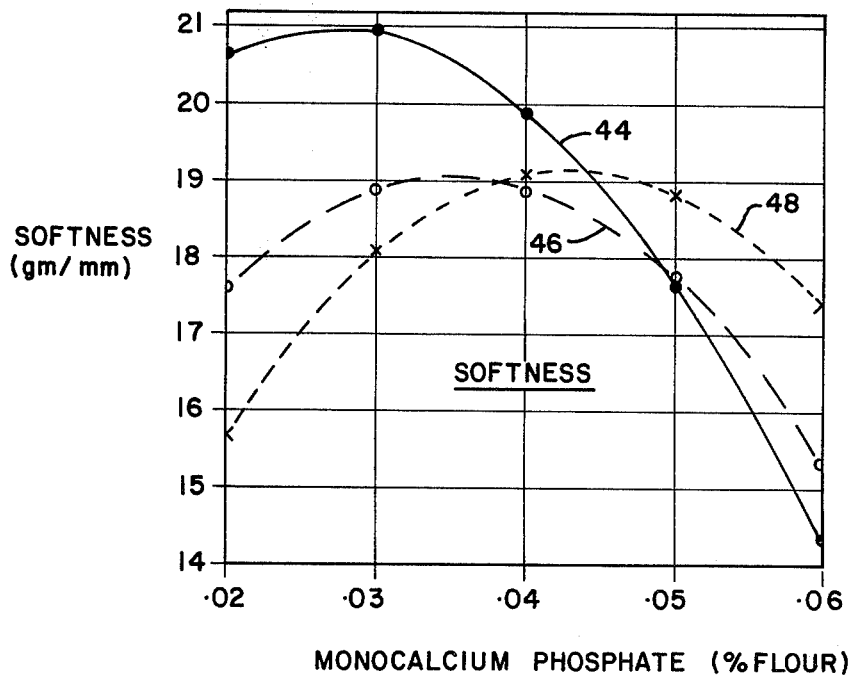
FIG.—2C

BAKERY PROCESS AND DEVELOPER COMPOSITION THEREFOR

CROSS REFERENCE TO RELATED APPLICATION

This application is a continuation-in-part of co-pending application Ser. No. 604,197, filed Aug. 13, 1975 now abandoned.

BACKGROUND OF THE INVENTION

Considerable effort has been expended in recent years to find a satisfactory bread improver for use in the so-called "short time" process, which would provide satisfactory dough and bakery product characteristics for varying markets. The Craig et al U.S. Pat. No. 3,803,326 discloses a particular example of a four-component additive composition (cysteine, whey, ascorbic acid and soya protein) which is intended to provide a high degree of flexibility to the processing as well as an adaptable variability of product characteristics to meet existing market conditions in various areas. The Craig et al U.S. Pat. No. 3,876,805 discloses combination type developer and conditioner products of a somewhat similar nature which rely upon the sulfhydryl activity of recently developed high protein concentrates. The general purpose of these prior dough improver and conditioner products is to avoid the wasteful expenditure of time and space normally required in conventional fermentation type processes (e.g., straight dough and sponge dough), through chemical development of the dough by means of the described agents.

Notwithstanding the benefits to be obtained from use of bread improvers and conditioners of the type described (i.e., adaptable variability in "short time" processing), the available agents have not proved entirely satisfactory for particular market conditions. Thus, despite the improvements noted, each dough formulation containing a bread improver must be tailored to the particular market for which the product is intended. By way of illustration, while leaven bread, sweet goods and the like are very popular in the Japanese market, bread and dough characteristics to satisfy the quality sensitive Japanese consumer are unique. In particular, satisfactory white bread for the Japanese market not only must have a very low specific volume compared to bread in the United States or Holland (3.7–5.5 as compared to 6.2–7.2), but the Japanese consumer also insists that the bread be fine, close grained and soft in texture. The bread must additionally have a good flavor and a golden-brown crust color. Changing market conditions are also imposing somewhat similar requirements upon the U.S. market. Young consumers, particularly, wanting to get away from the tasteless "balloon" bread found on the supermarket shelf, are presently demanding a unique combination of properties which is similar to those in the Japanese market, viz., a dense loaf of relatively low specific volume and a fine, close grained and soft texture. On the other hand, while corresponding to the concept of a "natural" product (as compared to machine-made bread), such product must also have good shelf life and keeping qualities.

In conventional bread making as practiced in the United States, the baker selects the ingredients and process conditions to provide a high and uniform gassing rate from the yeast (with proper selection of yeast foods for such purpose), to obtain proper development and maturity of the flour proteins and to insure good gas retention for loaf volume. While the resulting bread may have fine grain and soft texture, in contrast to the requirements stated above it will also have a very high specific volume. On the other hand, when the doughs are intentionally processed to provide dense, compact loaves, as in the case of German breads, the resulting products are characterized by an open grain quality and a very low degree of softness. The shelf life of such breads is also undesirably short. It follows that conventional procedures presently known in the baking industry, including the so-called "short time" processes, do not lend themselves to the production of bread of the Japanese type, that is, having a low specific volume but also a fine, close grain structure and soft texture. While the baker may be able to artificially decrease the loaf volume to some extent, for example, by reducing the length and temperature of the final proof period, the desired characteristics of fine grain quality and softness will not be obtained due to improper conditioning of the proteins. Other bakery procedures, such as under- or over-mixing, employing less maturing agent, or combinations of these procedures, are likewise ineffective to obtain the particular combination of bread properties described above. In this regard, the teachings of the prior art are very clear that a relatively high loaf volume of the order of 6.2 to 7.2 (and the ingredients, factors and conditions that provide such high loaf volume) is necessary to the production of the fine, close grained texture associated with softer bread. In fact, the so-called "squeeze" test for freshness is directly related to this concept, in that a bread with a high volume and low specific gravity is known to provide a softer loaf.

Because of differences in consumer preferences, as noted above, and essential differences in the processes adapted to satisfy these particular consumer requirements, there is presently a need for a bread developer and conditioner which will enable the production by the short time process of a bread which meets the current consumer requirements, particularly for a bread of very low specific volume which also has a fine-grained soft texture.

SUMMARY OF INVENTION AND OBJECTS

The present invention relates generally to a short time process for making leavened bread and like bakery products which are particularly characterized by a fine, close grained, soft texture and which also has a very low specific volume. The invention particularly relates to an improved developer composition for controlling the processing as well as the product characteristics for such purpose, and which may be effectively used with dough conditioning agents to enhance the desired characteristics and with processing agents to provide improved tolerance to processing conditions.

As noted above, known bakery processes as well as presently available compositions for improving dough and product characteristics render it very difficult to get the desired combination of bread properties described. The present invention overcomes this difficulty by providing an improved dough developer composition in the form of a dry mixture of previously available food ingredients, which are blended in critical proportions for the desired purpose. In particular, it has been found that a blended dry mixture ranging from 0.05 to 0.15% on the weight of the flour, and comprising (a) 0.003 to 0.009% of an amino acid reducing substance containing free sulfhydryl groups (b) 0.005 to 0.015% ascorbic acid and (c) 0.030 to 0.060% monocalcium phosphate together with an appropriate amount (0.025 to 0.03%) of a dry blending agent, can be mixed with conventional dough ingredients including flour, yeast, salt, and water to provide final bakery products which have the particular characteristics described. Specifically, use of the foregoing developer composition in a short time bread process will produce the desired dense compact loaf while still providing good grain quality and soft texture.

It has been particularly determined (and is claimed herein as an inventive concept) that the interaction of very minor amounts of monocalcium pnosphate with the ascorbic acid and amino acid reducing substance in the developer composition, enable the baker to obtain specific loaf volumes which are substantially below those normally obtained (i.e., 3.7–5.5 as compared to 6.2–7.2) while still obtaining a desired fine grain quality and soft texture in the loaf. Thus the purpose and level of use of monocalcium phosphate (0.03–0.06%, on the flour) in the present invention is in marked contrast to the purpose and level of use of this ingredient in prior bakery processes. Monocalcium phosphate has long been used as the acid ingredient in the so-called "acid type yeast foods," at levels ranging from 0.125 to 0.25% on the weight of the flour. The particular purpose was to counter the alkaline content of process water used in the bakery to provide proper yeast and flour enzyme activity and optimum response to oxidants and rope and mold inhibitors.[1] In accordance with the present invention, proportions of monocalcium phosphate ranging from ½ to 1/10 the amounts previously used only for pH adjustment unexpectedly combine with the cysteine and ascorbic acid

[1] See "Baking Technology and Engineering" by S. A. Matz, The Ave Publishing Co., Inc. 1960, pp 90, 91, 228,229. components to provide optimum desired characteristics as respects loaf volume, grain quality and softness of the processed bakery units.

It has been additionally determined that the described dough developer composition can be dry mixed or blended with various dough conditioning agents, selected from the group of edible fatty acid surfactants, and that the resulting dough developer/conditioner product greatly facilitates the production of bakery products having the desired characteristics, that is, very low specific volume together with a fine-grained, soft texture. Combination products produced in this manner also function in the dough system as a complete or total dough developer/conditioner product, with attendant advantages. We have additionally found that the combination developer/conditioner products can be further combined with blending agents, specifically, dried whey, soya flour, corn flour, nonfat dry milk solids, or mixtures of these ingredients to provide an unusual degree of processing tolerance as respects conditions for mixing the dough, floor times and dough temperatures. With certain flours, it is also advantageous to use a small proportion of an oxidizing agent, such as potassium bromate. Flavor improvers such as dry malt may be added. Thus, in addition to achieving the particular desired product characteristics, the combined products can provide all the desired or essential developing, emulsifying and conditioning properties for a given dough system, in a single additive composition.

In general, therefore, it is an object of the invention to provide a new improved short time process for making leavened bread, sweet goods and like bakery products, in which an improved developer composition is employed to obtain the desired characteristics of very soft, fine-grained texture in combination with a desired low specific volume.

Another object of the invention is to provide a novel developer composition consisting of a dry blend of three separate ingredients in critical proportions to obtain the foregoing desired characteristics of the bakery products.

A further object of the invention is to provide a new combined form of dough developer/conditioner product by which the foregoing objects of the invention are more advantageously achieved.

A still further object of the invention is to provide a new combined form of dough developer/conditioner product in combination with a processing agent, whereby enhanced processing tolerance is provided as respects such process variables as mixing requirements, floor times, dough temperatures and the like.

Further objects and features of the invention will appear from the following description in which the preferred embodiments have been set forth in detail in conjunction with the accompanying drawing.

BRIEF DESCRIPTION OF THE DRAWING

FIG. 1 is a flow sheet illustrating the use of the new dough developer composition in short time bakery processing according to the invention, to produce bakery products having the particular desired characteristics described.

FIGS. 2A, 2B and 2C are a composite graph illustrating particular features of the present invention.

DESCRIPTION OF PREFERRED EMBODIMENTS

The flow sheet of FIG. 1 respresents an exemplary short time procedure for carrying out the process of the present invention. As shown, all essential ingredients for making leaven bread and like bakery products including flour, yeast, salt, and water can be mixed with the new developer composition in a single mixing Step 8, to form a dough. According to a modification of this procedure, the developer composition can be premixed in Step 4 with the conditioning and/or processing agents to provide combination effects in the subsequent processing. As a further variation, the yeast can be initially slurried with the water in step 6, following which the remaining ingredients can be mixed with the slurry in Step 8 or, as indicated in a further mixing Step 10. In either event, mixing is completed within a total period of within about 3.5 to 9 minutes (high speed). Thus, according to one particular procedure, the ingredients are initially mixed in Step 8 for about 3 minutes, followed by a 3-minute period of mixing in Step 10 to incorporate the shortening. Such a procedure enables the developer composition of the present invention to be employed in relatively low-energy batch mixing steps, as represented generally by the Steps 4 through 10.

Following the mixing, the dough may be subjected to a short period of fermentation in Step 12 (e.g., 2–30 minutes), divided and rounded in Steps 14 and 16, subjected to intermediate proofing in Step 18 (e.g., 15 minutes), molded in Step 20 and subjected to final proofing in Step 22 (e.g., 35 to 45 minutes). The processing thus requires a total time through mixing, fermentation and proofing prior to bake of about 80 to 100 minutes maximum, thus providing the benefits of short time processing.

In general, the described processing is particularly adapted to making a variety of leaven breads such as white, raisin, rye and wholewheat bread, rolls, buns, sweet goods (including Japanese kashi-pain) and like bakery products possessing particular desired characteristics. Specifically, through use of the new developer composition, the resultant bakery products are characterized by a very low specific volume (e.g., 3.5 to 5.5 cc/gm.), a fine, close grain structure (generally above 10.0 with respect to a baking industry standard scale of 15) and a very soft texture (generally below about 22 gm/mm as respects an industry scale related to resistance to compression. With reference to the new "short time" baking processes, these product characteristics are unique in the baking industry, and are obtained by introducing the new developer composition during the mixing to form the dough, in a preselected controlled amount within a range from about 0.05 to 0.15% on the weight of the flour in the dough. Following the shortened mixing, dividing and proofing steps, as described above, the dough units are subjected to a conventional baking cycle in Step 24 (e.g., 35 minutes at 375°–390° F.) to produce the bakery products having the unique desired final characteristic described.

With reference to the effectiveness of the new developer composition to achieve the described benefits, the present invention is based on the discovery that very small levels of monocalcium phosphate, added in proper combination with ascorbic acid and the amino acid reducing substance, provides a solution to the paradox of making dense bread with fine grain quality and high softness. As previously noted, the level of monocalcium phosphate is in the range from about 0.03 to 0.06% on the weight of the flour in the dough, which compares with prior levels of use of this ingredient (for an entirely different purpose) ranging from 0.125 to as high as 0.25%, or even higher. For example, many continuous-mix bakers use monocalcium phosphate as a separate ingredient for pH adjustment, at levels of 0.2 to 0.5% on the weight of the flour. Federal bread standards permit the use of 0.75% monocalcium phosphate. In contrast, as used in the developer composition of the present invention, the indicated range for effective use of monocalcium phosphate is so narrow as to rule out the possibility that the effects are related merely to adjusting the pH of the dough. To the contrary, the surprisingly narrow range of effective use appears to be closely related to a chemical interaction within the dough system, between the monocalcium phosphate and the ascorbic acid. It further appears that the relatively narrow range of ascorbic acid (i.e., 0.005 to 0.015%) is likewise critical to successful use of the developer composition since, as will appear, a decrease or increase in the proportion of ascorbic acid with respect to the indicated range can have the effect of increasing the specific volume of resulting bakery products (see FIG. 2A). It thus appears that a peculiar synergism is developed between the monocalcium phosphate and ascorbic acid, in a short time dough system containing cysteine or like amino acid reducing substance, which achieves the particular desired benefits of the present invention.

The cooperative or synergistic effects of introducing small levels of monocalcium phosphate to the dough in proper combination with ascorbic acid is particularly illustrated with reference to FIGS. 2A, 2B and 2C. In this figure, the proportion of monocalcium phosphate as percent of the flour is plotted on the horizontal scale whereas the vertical scale is used to plot the particular characteristics of specific volume of the bakery unites (FIG. 2A), grain quality (FIG. 2B), and softness (FIG. 2C). More specifically, FIG. 2 is a composite graph of the combined effects of ascorbic acid and monocalcium phosphate on the desired product characteristics (i.e., specific volume, grain quality, and softness) with respect to the production of white bread in accordance with the concepts of the invention. Thus, based on a developer composition wherein the proportion of amino reducing substance is held constant (e.g., 0.006% of cysteine on the flour), varying proportions of monocalcium phosphate are plotted along the horizontal axis in each of the three FIGS. 2A, 2B and 2C. In FIG. 2A, the specific loaf volume of the bread is plotted along the vertical axis at three levels of ascorbic acid, namely 0.005, 0.010 and 0.015% as a percent of flour. In like fashion, FIG. 2B provides a plot of grain quality along the vertical axis, with respect to the same three levels of ascorbic acid, while FIG. 2C plots the softness of the bread texture in terms of resistance to compression in gm/mm. In general, all of the measurements indicated as plots on the separate graphs were obtained in accordance with standards generally accepted within the baking industry.

With particular reference to FIG. 2A, separate curves show that at each level of ascorbic acid, the specific volume reaches a maximum at levels of about 0.035 to 0.040% for monocalcium phosphate. Thus, at a lower acceptable range of 0.005% ascorbic acid, represented by the curve 30 in FIG. 2A, the specific volume varies from about 3.95 to 4.02 cc/gm. At the slightly higher level of 0.010% ascorbic acid, represented by the curve 32, the loaf volumes are further depressed to provide specific volumes in the range from about 3.78 to 3.86 At the higher acceptable level of ascorbic acid of 0.015%, represented by the curve 34, the range of specific volumes increases slightly to within the range from about 3.8 to 3.9. Accordingly, at the indicated levels of ascorbic acid, all values for monocalcium phosphate within the range from about 0.02 to 0.06% on the flour provide desired low levels of specific volume, with best results being obtained at the slightly higher levels of ascorbic acid (viz., 0.10 to 0.15%, on the flour).

The indicated synergism as respects the combined effects of ascorbic acid and monocalcium phosphate is again seen in FIG. 2B with respect to grain quality. In accordance with one standard for visually determining the grain quality (on a scale of 0 to 15), it was determined that all values for grain quality using the developer compositon of the invention were in excess of 10, fully the range to provide a fine, close-grained cell structure. With reference to FIG. 2B, curve 36 indicates that at an ascorbic level of 0.050%, grain quality increases almost linearly with increasing levels of monocalcium phosphate. At levels of 0.010 and 0.015% ascorbic acid, represented by the curves 38 and 40 respectively, the effect of the monocalcium phosphate is decreased slightly although excellent grain quality is maintained at nearly all levels of phosphate.

As illustrated in FIG. 2C, the measurements for softness generally reflect the pattern of FIGS. 2A and 2B. According to one standard procedure employed in the baking industry, softness is measured 24 hours after baking in terms of resistance to compression in grams per millimeter of indentation (gm/mm). Accordingly, the smaller the softness reading, the lower the level of resistance and therefore the softer the texture of the crumb. In general, values below about 22 gm/mm are considered satisfactory with optimum values ranging down to about 16 gm/mm. With reference to FIG. 2C, curve 42 shows that at 0.050% asorbic acid, levels of monocalcium phosphate within the range from 0.045 to 0.060% are required to obtain the desired degree of softness. At levels of 0.010 and 0.015% ascorbic acid, represented by the curves 44 and 46, respectively, all levels of monocalcium phosphate from 0.02 and 0.06% achieve the desired degree of softness, although better results are obtained at the higher and lower ends of this range. In general, the tolerance to phosphate is much broader with reference to the higher levels of ascorbic acid within the acceptable range.

Although based on a particular level of amino acid reducing substance in the developer composition (i.e., 0.006% cysteine), the results plotted in FIGS. 2A, 2B and 2C are generally representative of the cooperative synergism between the ascorbic acid and monocalcium phosphate at all levels of amino acid reducing substance within the specified range (viz., 0.003 to 0.009%). In general, the relationships shown in the various curves of FIG. 2 demonstrate the surprising effects of combining monocalcium phosphate and ascorbic acid in a dough developer within a very narrow range of proportions of ingredients, as specified in the appended claims.

With reference to the foregoing standard baking measurements, as representatively plotted in FIG. 2, it is noted that certain of the measurements are customarily incorporated into other somewhat more general measurements of bread quality, as routinely measured in the baking industry. By way of illustration, bakery products are frequently graded with respect to "external" and "internal" appearance. The numerical values associated with these appearance measurements are actually composite scores which sum up a number of individual bread characteristics, including the "softness" measurements of FIG. 2C. More specifically, the so-called "external" values include such items as color of crust, thinness of crust, shape of crust, degree of oven spring, and like external values. The so-called "internal" values include such items as fineness of grain, "whiteness" in the case of white bread, conformity and size and shape of cells and, of course, "softness." The latter value may be determined by touch or feel (e.g., squeezing) as well as by the previously mentioned standard compression test. These various distinctions are of importance in assessing the benefits of the present invention, as set forth hereinafter in the detailed examples related to the practice of the same.

With particular reference to the practice of the present invention, the developer composition is most easily formulated as a dry mix in conjunction with a diluent or blending aid, for example, dried whey, soya flour, corn flour, nonfat dairy solids, or mixtures of these. A relatively small amount of such blending aid (within the range from 0.020 to 0.050 on the weight of the flour) enables an effective dry blending of the ingredients to be achieved, wherein the principal ingredient by weight is monocalcium phosphate in homogeneous mixture with relatively smaller proportions of ascorbic acid and cysteine.

With reference to the particular ingredients, amino acids containing free sulfhydryl groups and having reducing properties adapted to use in the present invention include compounds selected from the group consisting of cysteine and glutathione, or combinations of these ingredients. Specific compounds found to be highly satisfactory include L-cysteine hydrochloride and glutathione. These compounds are sulfur containing type reducing agents, having free sulfhydryl (-SH) groups, and are neither toxic nor form any toxic or otherwise objectionable byproducts with other ingredients in the mix. Satisfactory amino acid reducing substances according to the invention include compounds related to or homologous with L-cysteine hydrochloride and D and DL-cysteine hydrochloride, free bases of L and D and DL-cysteine, L-cysteine monophosphate, di-L-cysteine sulfate and L-mono-cysteine tartrate. Homo-cysteine is likewise related to the foregoing compounds and can be used. In general, natural foods such as inactive dry yeast, unheated soya flour and other natural foods may be used as sources of cysteine and/or glutathione, the principle amino acid food substances contemplated for use in accordance with the present invention.

Ascorbic acid as used herein refers to L-ascorbic acid (Vitamin C). While ascorbic acid also exists in other forms, for example the isomer D-arabo-ascorbic acid, L-ascorbic is preferred because of its greater effectiveness in the developer composition and its ready availability as Vitamin C. While the function of ascorbic acid in the three component developer composition of the present invention is not precisely known, it is well known that L-ascorbic acid is converted to an oxidized form (dehydro-L-ascorbic acid) by enzymes and trace metals present in the flour system. One of the reactions that most likely takes place, therefore, is the oxidation of the flour protein by dehydro ascorbic acid to a polymeric form which strengthens the gluten chains in the dough. However, the dehydro ascorbic acid may also serve, particularly in an oxygen poor system, to protect the sulfhydryl groups of the amino acid reducing substance by slowing the rate of oxidation of these groups. On the other hand, the foregoing reactions in no way describe the peculiar synergistic effect achieved by interaction of ascorbic acid with the monocalcium phosphate to achieve the paradox of the present invention, that is, dough qualities to provide dense, compact bakery products having very fine close grained structures and a very high degree of softness, as hereinbefore described.

The term monocalcium phosphate as used herein refers to the commercially available food grade product in granular or, preferably, the powdered form, which is at least 95% pure. In this form, it is nonhygroscopic and therefore can be readily dry mixed or blended with the amino acid reducing substance and ascorbic acid.

Reference has previously been made to mixing or blending the developer compositions of the present invention with various dough conditioning agents to enhance the use of the developer composition for the desired purpose, and to also provide the characteristics of a total dough developer-conditioner product. Dough conditioning agents useful for this purpose are generally selected from the group of edible fatty acids surfactants and specifically those possessing emulsifying and dough conditioning properties. Included in this group are the mono and diglycerides of various fatty acids and their derivatives, and various surface active chemicals used as emulsifiers in foods, such as sorbitan and polyoxyethylene sorbitan derivatives of fatty acids. As a practical matter, it is preferred to use as dough conditioning agents the group of dough emulsifiers including the mono and diglycerides of long chain fatty acids, the group of dough conditioning agents including the ethoxylated monoglycerides of long chain fatty acids, the polyoxyethylene sorbitan esters of long chain fatty acids, and sodium and calcium steroyl lactylates.

In general, the dough conditioning agents are employed in a proportion ranging from about 1.5 to 4.5 parts of dough conditioning agent for each part of developer composition. Thus in the usual terms of percent on the flour in the dough, the dough conditioning agents will be present in an amount ranging from about 0.15 to 0.45%. Within this general range, operating levels of particular dough conditioning agents will vary in the sense that perhaps twice as much of the mono and diglycerides of long chain fatty acids will be required as the ethoxylated monoglycerides of long chain fatty acids or the polyoxyethylene sorbitan esters of long chain fatty acids. In like fashion, perhaps three to four times as much of the sodium and calcium stearoyl lactylates will be required. Of course, the various dough conditioning agents can be utilized in a mixture with the developer composition either alone, or in combinations with one another. Thus the mono and diglycerides of long chain fatty acids have been successfully used in combination with the ethoxylated monoglycerides of long chain fatty acids and also in combination with the polyoxyethylene sorbitan esters of long chain fatty acids. On the other hand, the sodium and calcium stearoyl lactylates are most effectively used in individual combination with the developer composition.

It has further been determined that processing tolerances to use of the developer composition are enhanced in the presence of certain processing agents, particularly dried whey, soya flour and nonfat dried milk solids. Dried whey for such purpose is available from commercial processes for the manufacture of cheese, such as Cheddar, Swiss, and/or cottage cheese. Spray dried concentrates from such processing are in a hydrate nonhygroscopic crystalline form which can be processed to a desired particle size adapted to use in the present invention. Thus, employing spray drying and atomizing steps according to conventional procedures, a granular product ranging in particle size from 74 to 420 microns can be obtained which can be further processed to very fine particles ranging in size from 50 to 200 microns. It will be appreciated that dried whey so processed is effective for use either as a processing agent, as above, or as a blending agent in the mixing of the developer composition in the manner previously described.

Soya flour used as a processing agent in the present invention (or as a blending agent) can be of the conventional full fat variety. Soya flours of this type normally function in dough systems as oxidizing agents, which may explain the stabilizing effect of using such material as a processing agent in the present invention.

Reference has also been made to the use of nonfat milk solids as a processing agent (or a blending agent) in accordance with the present invention. This terminology is meant to include the customary skim milk solids (i.e., skim milk powder) available from conventional dairy processing. In general, the processing agents herein, viz., dried whey, soya flour, or skim milk solids can be used in a proporation ranging from about 10 to 25 parts of processing agent for each part of the developer composition. Expressed as a percent on the flour in the dough, the processing agents will therefore be present in an amount ranging from about 1.0 to 2.5%. Within this general range, the operating levels of processing agents will depend upon whether such agents are used individually or in admixture with one another and, of course, on the particular dough system involved.

In processing based on the use of certain flours, for example, as customarily employed in the manufacture of bread in Japan, it is desirable to additionally add a proportion of a conventional oxidizing agent, such as potassium bromate, at levels within the range from 0.001 to 0.005% on the weight of the flour. Also, a proportion of dry malt, within the range from about 0.003 to 0.008% on the weight of the flour, can be added as a flavor improver. These ingredients are conveniently incorporated with the dried whey, corn flour, soya flour, etc., previously described for use as the blending aid.

In general, assuming that the new developer composition is formulated from an amino acid reducing substance (e.g., L-cysteine HCl), ascorbic acid (L-ascorbic acid), monocalcium phosphate (e.g., food grade) and a blending aid (e.g., dried whey), the proportions may range as follows:

|  | Percent |
| --- | --- |
| L-cysteine HCl | 3–9 |
| L-ascorbic acid | 5–15 |
| Monocalcium phosphate | 30–60 |
| Blending aid | 20–50 |

As previously noted, the foregoing developer composition can be used alone or in a dry mix or blend with a dough conditioning agent selected from the group of edible fatty acid surfactants, or with an additional amount of a processing agent, as herein described. Whether or not used individually or in the combined form, the desired characteristics of the new developer composition are obtained by adding the developer composition to the other ingredients during the mixing to form the dough, as in Step 8 in FIG. 1. Keeping in mind the essential range of proportions of ingredients is the developer composition, and also the proportion of developer composition with respect to the flour in the dough, as set forth above, the following table sets forth operable ranges as well as an optimum proportion of the several active ingredients expressed as a percent on the flour:

|  | Percent on Flour | |
| --- | --- | --- |
| Development Component | Operable range | Optimum |
| L-cysteine HCl | 0.003 to 0.009 | 0.007 |
| L-ascorbic acid | 0.005 to 0.015 | 0.005 |
| Monocalcium phosphate | 0.003 to 0.06 | 0.050 |
| Blending aid | 0.020 to 0.050 | 0.040 |

It will be understood that the developer composition made up of the specific ingredients identified above, at the optimum or within the foregoing operable range, is employed within the range of about 0.05 to 0.15% on the weight of the flour in the dough. Use of the developer composition is likewise generally in accordance with the processing as exemplified in FIG. 1, and may be based on use of the developer composition by itself or in combination with a dough conditioning agent and/or processing agent, as herein described.

With all of the foregoing in mind, the following examples are intended to be illustrative of the practice of the present invention and also of the beneficial use of the new developer composition. In these examples, all concentrations of ingredients are expressed as percent of flour.

EXAMPLE 1

WHITE BREAD, COMPARATIVE BAKING TEST

| | Regular Mix | With Developer |
|---|---|---|
| Ingredients | | |
| Flour | 100.0 | 100.0 |
| Sugar | 5.0 | 5.0 |
| Salt | 2.0 | 2.0 |
| Dried Whey | — | 0.1 |
| Non Fat Dry Milk | 3.0 | 3.0 |
| Shortening | 4.0 | 4.0 |
| Emulsifier | 0.2 | 0.2 |
| Yeast (freshly compressed) | 2.0 | 2.0 |
| Yeast food | 0.2 | — |
| Developer Composition: | | |
| L-cysteine HCL | | 0.005 |
| Ascorbic acid | | 0.005 |
| Monocalcium Phosphate | | 0.050 |
| Blending Aid (Dried Whey) | | 0.040 |
| Water | 64.0 | 64.0 |

PROCEDURE - REGULAR

1. Dissolve yeast in water (110°– 120° F).
2. Combine all ingredients including yeast/water mixture, and mix for 9 minutes to form soft dough.
3. Rest (floor time) for 20 minutes.
4. Divide and round.
5. proof (intermediate) for 8 minutes.
6. Proof (final) for 45 minutes at 100° –110° F and 90% relative humidity.
7. Bake for 30 – 35 minutes at 375° –380° F.

PROCEDURE - WITH DEVELOPER COMPOSITION

The procedure is the same as with the regular mix except for a substantially reduced period of mixing (4 minutes).

PROCEDURE - STANDARD SPONGE AND DOUGH

For comparison, a commercial white bread is made using a standard 3 hour sponge and dough procedure[2], with 15 to 20 minutes mix time, 30 minutes intermediate proof and 60 minute final proof.

[2]See "Baking Science and Technology", by E.J. Pyler Siebel Publishing Co. Vol. II, 1952, pp 388-391

RESULTS

The results with respect to the regular mix, the mix with the new developer composition, and the standard sponge and dough bread mix are set forth in the following table.

Table I

| Bread Characteristic Measured | Regular Mix | With New Developer Composition | Commercial Sponge and Dough Bread |
|---|---|---|---|
| Specific Volume (cc/gm) | 4.0 | 4.0 | 6.5 |
| External Score (1–20) | 16.1 | 18.6 | 17.0 |
| Internal Score (1–70) | 48.3 | 57.7 | 60.0 |
| Total Score (1–90) | 64.4 | 76.3 | 77.0 |

Table I-continued

| Bread Characteristic Measured | Regular Mix | With New Developer Composition | Commercial Sponge and Dough Bread |
|---|---|---|---|
| Grain (0–15) | 9.7 | 13.4 | 13.0 |
| Texture (0–15) | 9.4 | 13.4 | 13.0 |

Comparative bread scores show that controlling the processing of the regular mix to obtain a low specific volume (i.e., 4.0) equal to that of the bread made with the new developer composition resulted in greatly reduced quality of the regular mixed bread. In contrast, while keeping the desired low specific volume, use of the new developer composition in the formulation produced bread scores comparable to or in excess of those obtained with a commercial sponge and dough bread having a normal but relatively high specific loaf volume of 6.5. As respects the values for both "external" and "internal" grading, the scores for the bread made with the new developer composition were comparable or better than the values for the commercial bread and were significantly higher than those for the regular mixed bread. This fact is evidenced from the total scores which show that the bread made with the new developer composition scored 76.3 as compared to 77.0 for the commercial bread and 64.4 for the regular mix. The bread made with the new developer composition also scored significantly higher with respect to the important characteristics of grain and texture (e.g., softness), developing scores of 13.4 in each of these categories as compared to 13.0 for the commercial bread and 9.7, 9.4 for the regular mix bread. In this regard, the rating for "texture" is determined visually and manually (by feeling and squeezing the slice) so that, as contrasted to the compression test of FIG. 2C, a higher score means a softer bread.

In general, use of the new developer composition achieves the desired qualities of a dense compact loaf having fine, close grain and softness without loss of other desired values. Thus, the taste and aroma of bread made with the developer composition is excellent, and at least equal to that of the best commercial bread and better than that of the regular mixed bread. The toasting quality is also excellent.

EXAMPLE 2 - HOME MIXED WHITE BREAD

Dough Formula

The dough formulas are the same as in Example 1. However, with respect to the formula containing the new developer composition, the yeast and the remaining dry ingredients are separately packaged for incorporation in a dry mix. The regular dough formula was similarly prepared for use as a dry bread mix.

PROCEDURE - REGULAR

1. Dissolve yeast in water (110° – 120° F).
2. Add dry mix to yeast/water mixture.
3. Knead to form soft dough, cover with bowl and rest 10 minutes.
4. Knead dough by hand on floured board until dough is smooth and elastic (about 12 minutes).
5. Cover dough with bowl and rest another 10 minutes.
6. Divide dough into two equal parts, press out flat, roll and shape into loaves.

7. Proof for 46 minutes at 100° – 110° F.
8. Bake for 30 – 35 minutes at 375° – 385° F.

PROCEDURE - WITH DEVELOPER COMPOSITION

The procedure is the same as with the regular mix except for a substantially reduced period of kneading (4 minutes).

RESULTS

The results with respect to the regular mix, and the mix with the new developer composition are set forth in the following table.

Table II

| Bread Characteristic | Regular Mix | With Developer |
|---|---|---|
| Specific Volume (cc/gm) | 3.9 | 4.1 |
| External Score (1–20) | 15.5 | 18.9 |
| Internal Score (1–70) | 49.5 | 59.4 |
| Total Score (1–90) | 65.0 | 78.3 |
| Grain (0–15) | 9.5 | 13.1 |
| Texture (0–15) | 10.7 | 13.3 |

Table II shows that use of the new developer composition in the pre-packaged home mix provides benefits (as demonstrated by the bread scores) which are substantially the same as those obtained with the machine mix procedures for commercial bakeries. Thus, at a desired low specific loaf volume, bread scores with the new developer composition (viz., external, internal and total) are substantially higher than those obtained with the regular mix and, moreover, represent the difference between success and failure as respects consumer acceptance of the product. The scores for grain and texture (viz.,"softness") particularly indicate that the new developer composition enables production of home mixed bread having a soft texture and fine grain, as well as a desired low specific volume. In contrast, the scores for the regular mix bread indicate that artificially reducing the specific loaf volume produces bread of inferior quality.

EXAMPLE 3

WHOLE WHEAT BREAD

| | Regular Mix | With Developer |
|---|---|---|
| Ingredients: | | |
| Whole Wheat Flour | 100.0 | 100.0 |
| Sugar | 5.0 | 5.0 |
| Shortening | 4.0 | 4.0 |
| Non Fat Dry Milk | 2.0 | 2.0 |
| Salt | 2.0 | 2.0 |
| Lactose | — | 0.3 |
| Dried Whey | — | 0.1 |
| Emulsifier | 0.2 | 0.2 |
| Yeast | 2.0 | 2.0 |
| Yeast Food | 0.2 | — |
| Developer Composition: | | |
| L-cysteine HCL | | 0.005 |
| Ascorbic acid | | 0.005 |
| Monocalcium Phosphate | | 0.050 |
| Blending Aid (Dried Whey) | | 0.040 |
| Water | 64.0 | 64.0 |

MIXING AND BAKING PROCEDURE

The procedures for preparing and baking loaves of whole wheat bread are substantially equivalent to those set forth in Example 1 except that, in this instance, the dough mixing time was the same (5 minutes) for both the regular mix and the mix with the new developer composition.

RESULTS

The results in the form of comparative bread scores for the regular mix and the mix with the new developer composition are set forth in Table III below.

Table III

| Bread Characteristics | Regular Mix | With Developer |
|---|---|---|
| Specific Volume (cc/gm) | 3.6 | 3.5 |
| External Score (1–20) | 14.8 | 18.5 |
| Internal Score (1–70) | 51.2 | 54.5 |
| Total Score (1–90) | 66.0 | 73.0 |
| Grain (0–15) | 10.5 | 11.9 |
| Texture | 10.0 | 11.5 |

Although not as satisfactory as in the case of the tests on white bread, the above test results show that use of the new developer composition to produce bread of desired low specific volume, achieves substantially higher bread scores as related to the regular mix. They also demonstrate for the new procedure, the obtaining of the desired characteristics of fine grain and softness in a bread of low specific volume.

EXAMPLE 4

HOME MIX RYE BREAD

| | Regular Mix | With Developer |
|---|---|---|
| Ingredients: | | |
| Bread Flour | 80.0 | 80.0 |
| Dark Rye Flour | 20.0 | 20.0 |
| Sugar | 3.0 | 3.0 |
| Shortening | 3.0 | 3.0 |
| Salt | 2.0 | 2.0 |
| Lactose | — | 0.3 |
| Dried Whey | — | 0.1 |
| Yeast (dry) | 2.0 | 2.0 |
| Wheat Gluten | 0.5 | 0.5 |
| Caroway (Ground) | 0.3 | 0.3 |
| Yeast Food | 0.2 | — |
| Developer Composition: | | |
| L-cysteine HCL | | 0.005 |
| Ascorbic acid | | 0.005 |
| Monocalcium Phosphate | | 0.050 |
| Blending Aid (Dried Whey) | | 0.040 |
| Water | 64.0 | 64.0 |

MIXING AND BAKING PROCEDURE

The preparation procedures are substantially identical to those set forth in Example 2, with respect to both the regular mix and the mix employing the new developer composition.

RESULTS

Test results relating to the baked loaves are set forth in Table IV below.

Table IV

| Bread Characteristics | Regular Mix | With Developer |
| --- | --- | --- |
| Specific Volume (cc/gm) | 4.2 | 3.6 |
| External Score (1–20) | 14.4 | 18.2 |
| Internal Score (1–70) | 51.5 | 59.1 |
| Total Score (1–90) | 65.9 | 77.3 |
| Grain (0–15) | 10.7 | 13.0 |
| Texture (0–15) | 10.5 | 12.8 |

The test results again demonstrate the improved bread quality obtained with the new developer composition, specifically with respect to the obtaining of fine grain quality and soft texture, in a rye bread having a very low specific loaf volume.

EXAMPLE 5

WHITE BREAD (Developer + Dough Conditioner; Developer + Dough Conditioning + Processing Agent)

| | Developer + Conditioning Agent | Developer + Conditioning Agent + Processing Agent |
| --- | --- | --- |
| Ingredients: | | |
| Flour (50% soft, 50% hard) | 100.0 | 100.0 |
| Sugar | 5.0 | 5.0 |
| Salt | 2.0 | 2.0 |
| Non Fat Dry Milk | 1.0 | 1.0 |
| Shortening | 4.0 | 4.0 |
| Emulsifier | 0.2 | 0.2 |
| Yeast | 3.5 | 3.5 |
| Developer Mixture: | | |
| L-cysteine HCL | 0.0075 | 0.0075 |
| Ascorbic acid | 0.0100 | 0.0100 |
| Monocalcium Phosphate | 0.0550 | 0.0550 |
| Blending Aid (Dried Whey) | 0.0275 | 0.0275 |
| Dough Conditioner[1] | 0.3 | 0.3 |
| Processing Agent[2] | — | 2.0 |
| Water | 63.0 | 63.0 |

[1] Blend of mono and diglyceride of long chain fatty acids ("Rikemal", as manufactured by Oriental Yeast Co., Ltd., Tokyo, Japan).
[2] Dried Whey.

PROCEDURE - BOTH MIXES

Apart from the added developer mixture, the dough formulation and mixing procedures are typical of the procedures used in Japan for short time bread. The particular steps in the procedure are as follows:
1. Combine all ingredients (except shortening) and mix 5 minutes to form a dough.
2. Add shortening and mix 4 minutes at high speed (dough temperature 86°–90° F).
3. Place dough in trough and allow recovery time of 20 minutes.
4. Divide and round.
5. Proof (intermediate) for 15 minutss.
6. Mould.
7. Proof (final) for 40 minutes.
8. Bake at 392°–400° F for 35 minutes.

RESULTS

The results obtained with use of the new developer composition in admixture with the indicated dough conditoning agent, and additionally with such developer-conditioner mixed with dried whey as a blending agent, are set forth in Table V below.

Table V

| Bread Characteristics | Developer + Conditioning Agent | Developer-Conditioner + Processing Agent |
| --- | --- | --- |
| Specific volume (cc/gm) | 3.7 | 3.8 |
| External Score (0–30) | 27.5 | 29.0 |
| Internal Score (0–25) | 22.0 | 23.0 |
| Total Score (0–55) | 49.5 | 52.0 |
| Grain (0–15) | 12.5 | 14.0 |
| Softness by Compressibility (gm/mm) | 22.0 | 19.0 |

Use of the developer composition in conjunction with a mono and diglyceride type dough conditioning agent produced bread of a very high quality, as represented by the total score related to the baked loaves (49.5 out of a possible 55). Such bread had a low specific volume, desirable softness (as determined by the compressibility test) and a fine-grained texture. Adding a proportion of dried whey to the developer-conditioner as a processing agent resulted in even higher bread scores as represented by the unusually high score for grain quality (14 out of a possible 15) and the total of the external and internal scores (52 out of a possible 55). In general, use of a processing agent with the developer-conditioner composition facilitated the production of very high quality bread having low specific volume and enhanced characteristics of grain quality and softness.

EXAMPLE 6

JAPANESE WHITE BREAD, COMPARATIVE BAKING TEST

| | Regular Mix | With Developer |
| --- | --- | --- |
| Ingredients: | | |
| Flour (50% soft, 50% hard) | 100.0 | 100.0 |
| Sugar | 5.0 | 5.0 |
| Salt | 2.0 | 2.0 |
| Nonfat Dry Milk | 2.0 | 2.0 |
| Shortening | 4.0 | 4.0 |
| Emulsifier | 0.3 | 0.3 |
| Yeast | 2.3 | 0.3 |
| Yeast Food | 0.1 | — |
| Developer Composition: | | |
| L-cysteine HCl | | 0.007 |
| Ascorbic Acid | | 0.005 |
| Monocalcium Phosphate | | 0.050 |
| Blending Aid | | |
| Corn Flour | | 0.020 |
| Dried Whey | | 0.010 |
| Potassium Bromate | | 0.003 |
| Dry Malt | | 0.005 |
| Water | 63.0 | 63.0 |

PROCEDURE - WITH DEVELOPER COMPOSITION

The formulation and mixing procedures are similar to those described in Example 5. The specific procedure is as follows:
1. Combine and mix all ingredients at low speed, mix at high speed for 2½ minutes to form a dough. The temperature of the water should be adjusted to give a final dough temperature of 75° F (28.5° C.).
2. Place dough in trough and allow recovery time of 30 minutes.

3. Divide and round.
4. Proof (intermediate) for 15 minutes.
5. Mold.
6. Proof (final) for 46 minutes.
7. Bake at 392° – 400° F. for 35 minutes.

PROCEDURE - STANDARD SPONGE AND DOUGH

For comparison, a white bread is made using a conventional sponge and dough procedure. After a four hour sponge step, the sponge plus remaining ingredients are mixed at low speed and developed for 2 minutes at high speed. Final dough temperature is 74° F. (28.0° C.), with 20 minutes intermediate proof and 53 minutes final proof.

RESULTS

The results with respect to the mix with the new developer composition, and the standard sponge and dough bread mix, are set forth in the following table.

Table VI

| Dough Characteristics | Standard Sponge and Dough Bread | With Developer Composition |
| --- | --- | --- |
| pH after mixing | 5.57 | 5.60 |
| pH after proof | 5.25 | 5.25 |
| Extensibility[1] after floor | 4.5 | 4.3 |
| Extensibility[1] after bench | 4.5 | 3.5 |
| Stickiness[2] after floor | 4.5 | 4.3 |
| Stickiness[2] after bench | 4.0 | 4.0 |
| Bread Characteristics | | |
| Weight - grams | 398 | 400 |
| Height - cm | 11.7 | 11.7 |
| Volume - ml. | 2180 | 2150 |
| Specific Volume - cc/gm | 5.38 | 5.48 |
| Grain | 6.5 | 6.5 |
| Appearance | 6.7 | 6.7 |
| Crust Color | 7.2 | 7.2 |
| Aroma | 7.0 | 6.5 |
| Taste | 7.0 | 6.5 |
| pH | 5.60 | 5.60 |

[1]Measured on arbitrary scale ranging from a low of 1 for nonextensible doughs to 5 for highly extensible doughs.
[2]Likewise measured on arbitrary scale from a low of 1 for nonsticky doughs to a high of 5 for sticky doughs.

Use of the new developer composition in conjunction with a flour as conventionally used in the manufacture of bread in Japan produced a final bread product of very high quality, equivalent in all the essential respects to standard sponge and dough breads. Dough quality was also equivalent to sponge and dough quality. In this regard desirable values for both "extensibility" and "stickiness" are in the range from 3.5 to 4.5 and, as indicated the doughs produced with use of the new developer composition were within this range, and equivalent to the sponge and bread doughs. Final bread characteristics were excellent, with the values for loaf height, volume and specific volume being virtually identical. Measurement of grain appearance, crust color, aroma and taste, according to standards customarily used in the Japanese bakery trade, likewise indicated substantial equivalence in the final bread characteristics.

The foregoing examples were chosen to illustrate the use of the new developer composition in a short time process for making high quality bread of low specific volume. The examples particularly demonstrate the use of the developer composition and modifications thereof in the production of baked products with low specific volume which also have a desired fine grain structure and high degree of softness. It will be appreciated that it is not practical or feasible to illustrate all possible variations by way of specific example, and the disclosures and descriptions herein should consequently be considered as merely illustrative and not in any sense limiting.

What is claimed is:

1. A short time process for the manufacture of leaven bread and like bakery products, particularly characterized by a very soft and fine-grained texture and also by a very low specific volume, comprising the steps of adding to conventional dough ingredients including flour, yeast, salt, and water from 0.05 to 0.15% on the weight of the flour of a developer composition in the form of a blended dry mixture of (a) 0.003 to 0.009% of an amino acid reducing substance selected from the group consisting of cysteine, glutathione and mixtures thereof (b) 0.005 to 0.015% ascorbic acid (c) 0.030 to 0.060% of monocalcium phosphate, together with 0.020 to 0.050% of a dry blending agent, thereafter mixing said dough ingredients and developer composition to form a dough, forming said dough into units for baking, and thereafter proofing and baking said units to provide final baked products having the particular desired characteristics described.

2. A process as in claim 1 wherein said dry blending agent is selected from the group of dried whey, soya four, corn flour, nonfat dried milk solids and mixtures thereof.

3. A process as in claim 1 wherein prior to mixing said dough developer composition with the dough ingredients to form a dough, the developer composition is blended with from 0.15 to 0.45% on the weight of the flour of a dough conditioning agent selected from the group consisting of monoglycerides of long chain fatty acids, diglycerides of long chain fatty acids, ethoxylated monoglycerides of long chain fatty acids, polyoxyethylene sorbitan esters of long chain fatty acids, sodium stearoyl lactylates, calcium stearoyl lactylates, and mixtures thereof.

4. A process as in claim 3 wherein prior to the mixing to form a dough, said mixture of developer composition and dough conditioning agent is additionally blended with from 1.0 to 2.5% on the weight of the flour of a processing agent selected from the group consisting of dried whey, soya flour, nonfat milk solids, and mixtures thereof.

5. A developer composition particularly adapted to the production of leaven bread and like bakery products particularly characterized by a very soft and fine-grained texture and a very low specific volume, said developer composition being in substantially dry, free-flowing form and consisting essentially on a dry solids basis of (a) 3 to 9% amino acids selected from the group consisting of cysteine, glutathione and mixtures thereof (b) 5 to 15% ascorbic acid and (c) 30 to 60% monocalcium phosphate together with 20 to 50% of a dry blending agent.

6. A developer composition as in claim 5 wherein said amino acid is L-cysteine HCl.

7. A developer composition as in claim 5 wherein the ascorbic acid is in the form, L-ascorbic acid.

8. A developer composition as in claim 5 wherein said dry blending agent is selected from the group consisting of dried whey, soya flour, corn flour, nonfat dry milk solids, and mixtures thereof.

9. A developer composition as in claim 5 wherein said developer composition contains a dough conditioning agent selected from the group consisting of monoglycerides of long chain fatty acids, diglycerides of long chain fatty acids, ethoxylated monoglycerides of long chain fatty acids, polyoxyethylene sorbitan esters of long chain fatty acids, sodium stearoyl lactylates, calcium stearoyl lactylates, and mixtures thereof, which dough conditioning agent is homogenously dry blended therewith, the proportion of dough conditioning agent in the dry blend being such that there is 1.5 to 4.5 parts of the dough conditioning agent for each part of developer composition.

10. A developer composition as in claim 9 wherein said dry blend of developer composition and dough conditioning agent contains a processing agent selected from the group consisting of dried whey, soya flour, corn flour, nonfat dry milk solids and mixtures thereof, which processing agent is homogenousy dry blended therewith, the proportion of said processing agent in the dry blend being such that there are 10 to 25 parts of the processing agent for each part of developer composition.

11. A developer composition as in claim 5 additionally including from 0.001 to 0.005% on the weight of the flour of an oxidizing agent.

12. A developer composition as in claim 5 wherein said blending agent is a mixture of dried whey and corn flour.

13. A developer composition as in claim 12 including from 0.003 to 0.008% on the weight of the flour of dry malt.

* * * * *